(No Model.)

H. S. HIRSCH.
BICYCLE LAMP.

No. 565,272. Patented Aug. 4, 1896.

Witnesses.
A. V. Groups
A. V. Blackwood.

Inventor.
Henry S. Hirsch,
per John R. Nolan
Attorney.

UNITED STATES PATENT OFFICE.

HENRY S. HIRSCH, OF PHILADELPHIA, PENNSYLVANIA.

BICYCLE-LAMP.

SPECIFICATION forming part of Letters Patent No. 565,272, dated August 4, 1896.

Application filed March 3, 1896. Serial No. 581,628. (No model.)

*To all whom it may concern:*

Be it known that I, HENRY S. HIRSCH, a citizen of the United States, residing at the city and county of Philadelphia and State of Pennsylvania, have invented certain new and useful Improvements in Bicycle-Lamps, of which the following is a full, clear, and exact description, reference being had to the accompanying drawings, forming a part of this specification.

The object of my invention is to provide a bicycle-lamp of such construction that it may be contracted or expanded at will, to the end that the lamp may be carried in the ordinary tool-bag of a bicycle or be mounted on the wheel for service, as occasion may require.

My invention accordingly comprehends a lamp having a telescopic body, together with novel features of construction which will be hereinafter particularly described and claimed.

Figure 1:
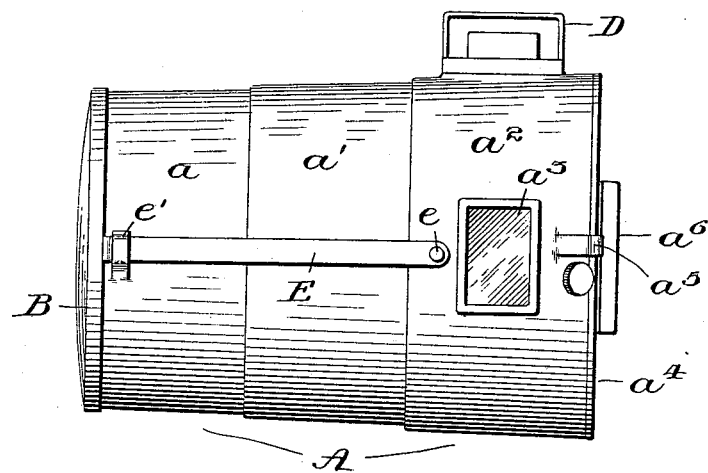
Figure 2:
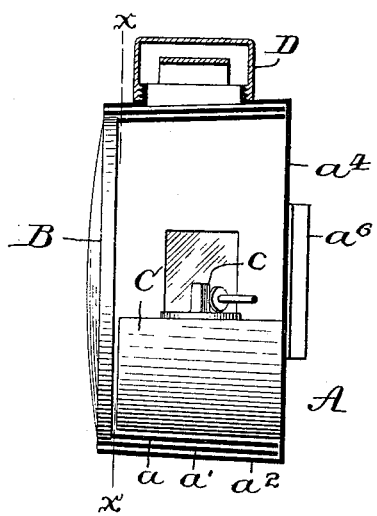
Figure 3:
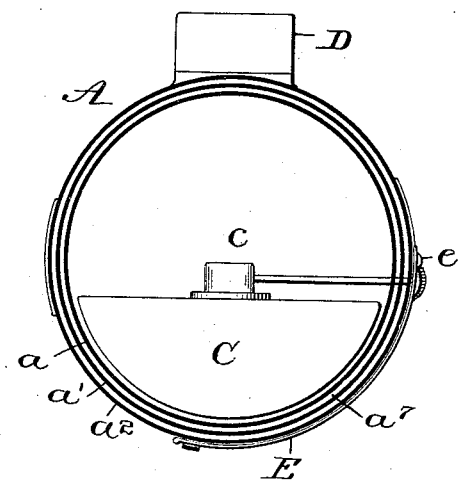

In the drawings, Figure 1 is a side elevation of the lamp as extended. Fig. 2 is a vertical section thereof as collapsed. Fig. 3 is a transverse section, as on the line $x\ x$ of Fig. 2.

A is the body of the lamp, the same comprising a series of telescopic tubular sections $a\ a'\ a^2$, which may be extended outward for use or be contracted into small compass for convenience of transportation. In the present instance there are three sections; but of course the number may be changed without affecting my invention. To the outer end of the forward or smallest section $a$ the bull's-eye B is secured, while within the largest section $a^2$ the oil-tank C and its burner $c$ are mounted. This latter section is also provided with the side lights $a^3$. The tank is secured to a hinged head or cap $a^4$ on the outer extremity of the section $a^2$, to the end that the tank and burner may be readily exposed for purposes of filling, cleaning, lighting, &c. This head is provided with a suitable catch $a^5$, whereby it may be fastened when closed. It is also provided with a suitable loop or socket $a^6$, by means of which it may be attached to the usual lamp-holder on the bicycle.

The oil-tank is curved correspondingly with the interior of the section $a^2$ and is sustained a suitable distance from the wall of the latter in a manner to afford an intermediate space $a^7$ for the passage of the other sections when they are telescoped. The cowl D is screwed to the top of the section $a^2$ directly above the burner, to the end that the cowl may be detached from the exterior and set within the interior of the section preparatory to the telescoping of the sections.

From the foregoing it will be obvious that when the lamp is contracted it may be carried in an ordinary tool-bag on a bicycle, and should it be desired to use the lamp it may be readily taken out, extended, and applied to the wheel for service.

While ordinarily the frictional connection of the sections will maintain them extended, yet I prefer to employ other means to obviate any liability of their being displaced by the jolting of the bicycle, which means, in this instance, comprises a curved spring-band E, one end of which is pivoted, as at $e$, to the side of the section $a^2$. When the sections are collapsed, this band embraces the section $a^2$, as shown in Fig. 3; but when the sections are extended the band is swung around laterally of the lamp and its free end sprung into a suitable keeper $e'$ on the section $a$.

I claim as my invention—

1. A lamp comprising horizontally-telescoping tubular case-sections, one of which has a glass, and another of which has a movable head or cap, and an oil-tank and burner affixed to the said head or cap in such a manner as to leave within said section a surrounding space for the other section or sections when telescoped, substantially as specified.

2. A bicycle-lamp, comprising a number of tubular, horizontally-telescoping sections, one of which has a glass at its outer end, and another of which has a movable head or cap, and an oil-tank affixed to said head or cap and supported thereby, said tank having a burner which is perpendicular with respect to the axis of said sections, substantially as specified.

3. The herein-described lamp, comprising a body composed of telescopic, tubular sections, one of said sections having a glass at its end, and another a movable head, a detachable cowl, and side lights, and an illuminating-burner affixed to the inside of said head, and adapted to receive around it the other section or sections when they are telescoped, substantially as specified.

4. The herein-described bicycle-lamp, comprising a body or case portion composed of tubular, horizontally-telescoping sections, the forward, or smallest of said sections having a glass at its outer end, and the largest section having a head or cap movably secured to its outer extremity, and an oil-tank and burner secured to the inside of said head or cap, together with means for securing said head or cap in closed position, and other means whereby it may be secured to the lamp-holder of a bicycle, substantially as specified.

5. A lamp comprising telescopic sections, one of which is provided with a glass, and another of which is provided with an illuminating device, in combination with a curved spring-band pivoted to one section and adapted to be engaged with the other, to maintain the sections extended, substantially as described.

6. A lamp comprising a series of telescopic tubular sections, $a$, $a'$, $a^2$, a glass B on the outer end of the section $a$, an end head on the section $a^2$, and an oil-tank and burner secured to the inner side of said head in a manner to afford a space $a^7$ for the telescoped sections, substantially as described.

7. A lamp comprising a series of telescopic tubular sections $a$, $a'$, $a^2$, a glass B on the outer end of the section $a$, a hinged end head on the section $a^2$, an oil-tank and burner secured to the inner side of said head, and a cowl detachably secured to the section $a^2$, substantially as described.

In testimony whereof I have hereunto affixed my signature in the presence of two subscribing witnesses.

HENRY S. HIRSCH.

Witnesses:
ANDREW V. GROUPE,
JOHN R. NOLAN.